(12) United States Patent
Lynn

(10) Patent No.: US 7,013,836 B1
(45) Date of Patent: Mar. 21, 2006

(54) ENHANCING MATURATION OF OOCYTES IN BIVALVES

(75) Inventor: John W. Lynn, Baton Rouge, LA (US)

(73) Assignee: Board of Supervisors of Louisiana State University and Agricultural and Mechanical College, Baton Rouge, LA (US)

( * ) Notice: Subject to any disclaimer, the term of this patent is extended or adjusted under 35 U.S.C. 154(b) by 5 days.

(21) Appl. No.: 10/603,134

(22) Filed: Jun. 24, 2003

Related U.S. Application Data

(60) Provisional application No. 60/392,127, filed on Jun. 27, 2002.

(51) Int. Cl.
*A01K 80/00* (2006.01)

(52) U.S. Cl. ..................................... 119/236
(58) Field of Classification Search ................ 119/234, 119/236
See application file for complete search history.

(56) References Cited

OTHER PUBLICATIONS

Fong, "Zebra Mussel Spawning Is Induced in Low Concentrations of Putative Serotonin Reuptake Inhibitors," *Biol. Bull.*, vol. 194, pp. 143-149 (1998).

Li, Q. et al., "Changes in vitellin during oogenesis and effect of estradiol-17β on vitellogenesis in the Pacific oyster *Crassostrea gigas*," *Invert. Reprod. Dev.*, vol. 33, pp. 87-93 (1998).

Lynn, J. et al., Excerpts from "Conservation of broodstock: Developing improved methodology for maturation and induced spawning of oysters," United States Department of Agriculture grant proposal (2002).

Lynn, J. et al., Excerpts from "Conservation of rare brood stock: Developing improved methodology for gonadal maturation and inducing spawns in *Crassostrea virginica*," Gulf Oyster Industry Program grant proposal (2001).

Lynn, J. et al., Excerpts from "Conservation of rare broodstock: Developing improved methodology for maturation and induced spawning of oysters," Louisiana Board of Regents grant proposal (2001).

Matsutani, T., "Endogenous factors controlling spawning in marine bivalves," pp. 231-237 in M. Hoshi et al. (Eds.) *Advances in Invertebrate Reproduction*, vol. 5 (1990).

Matsumoto, T. et al., "Gonadal estrogen profile and immunohistochemical localization of steroidogenic enzymes in the oyster and scallop during sexual maturation," *Comp. Biochem. Physiol.*, vol. 118B, pp. 811-817 (1997).

Matsutani, T. et al., "Induction of spawning by serotonin in the scallop, *Patinopecten yessoensis* (Jay)," *Mar. Biol. Lett.*, vol. 3, pp. 353-358 (1982).

Matsutani, T. et al., "In vitro effects of serotonin and prostaglandins on release of eggs from the ovary of the scallop, *Patinopecten yessoensis*," *Gen. Comp. Endocrin.*, vol. 67, pp. 111-118 (1987).

Mori, K., "Effect of Steroid on Oyster—IV. Acceleration of Sexual Maturation in Female Crassostrea gigas by Estradiol-17ȳ," Bull. Jpn. Soc. Sci. Fish., vol. 35, pp. 1077-1079 (1969).

Osada, M. et al., "Estrogen effect on the seasonal levels of catecholamines in the scallop *Pathinopecten yessoensis*," *Comp. Biochem. Phys.*, vol. 93C, pp. 349-353 (1989).

Osada, M. et al., "In vitro effects of estrogen and serotonin on release of eggs from the ovary of the scallop," *Nip. Suisan Gakk. (Jpn. Soc. Sci. Fish. Bull.)*, vol. 58, pp. 223-227 (1992).

Osada, M. et al., "Pharmacological characterization of serotonin receptor in the oocyte membrane of bivalve molluscs and its formation during oogenesis," *J. Exp. Zool.*, vol. 28, pp. 124-131 (1998).

Osada, M. et al., "The levels of prostaglandins associated with the reproductive cycle of the scallop, *Patinopecten yessoensis*," *Prostaglandins*, vol. 40, pp. 229-239 (1990).

*Primary Examiner*—T. Nguyen
(74) *Attorney, Agent, or Firm*—John H. Runnels

(57) ABSTRACT

A method is disclosed for using a spawning agent and a steroid to stimulate gonadal development, oocyte maturation, and meiotic synchrony in oysters and other bivalves. Advantages of the novel technique include a decrease in the variability of fertilization among different individuals, a decrease in the variability of larval production by synchronizing gamete maturation within a population, the ability to mature and spawn broodstock without sacrificing the animals, to conserve and maintain genetic lines, and the ability to improve cross-breeding programs, with or without the use of transgenics, by repeated spawning of individuals. The method may be used, for example, in oyster hatchery production, with an emphasis on conservation of broodstock. The invention allows the successful and repeatable breeding of either diploids or polyploids, selective breeding, and the breeding of transgenic oyster lines, all without the need to sacrifice the founder animals. The animals are first treated with estradiol-17β or an agonist. The estradiol-17β or agonist promotes the maturation of oocytes, so that mature oocytes are then released with high meiotic synchrony in response to subsequent induced spawning stimuli such as serotonin.

23 Claims, No Drawings

ENHANCING MATURATION OF OOCYTES IN BIVALVES

The benefit of the Jun. 27, 2002 filing date of provisional application 60/392,127 is claimed under 35 U.S.C. § 119(e).

The development of this invention was partially funded by the Government under grant number NA8RG0073 awarded by the National Oceanographic and Atmospheric Administration. The Government has certain rights in this invention.

This invention pertains to methods for enhancing the maturation of oocytes in bivalves such as oysters and scallops, and to methods for synchronizing the release and meiotic phase of mature oocytes from bivalves, without the need to sacrifice the brood stock.

Between 1995 and 2000, over 125 million pounds of the eastern oyster, *Crassostrea virginica*, were landed in the United States, with well over 90% of that production in the Gulf Coast states. Landings of the Pacific oyster, *C. gigas*, during the same period were over 50 million pounds. However, there has been a steady decline in annual landings during the past 5 years. The declines probably result from several factors, including disease, predation, pollution, and declines in seasonal meat yields. Most producers on the Gulf and Atlantic coasts still depend heavily on natural spat fall on public grounds from *C. virginica* as sources for seed to transplant to private leases. Disease, dependency on wild spat fall, environmental variability, and changeable private leasing policies all contribute to an unpredictable annual oyster harvest. In recent years, parasites such as *Perkinsus marinus*, and opportunistic bacteria including the *Vibrio* spp. have emphasized the need for new techniques for producing large numbers of oyster larvae with enhanced growth and disease resistance. Many of these efforts have focused on improving genetic strains through polyploid production, selective breeding, or transgenic technology. However, each of these techniques has until now relied (primarily, if not exclusively) on gametes stripped from sacrificed animals.

Techniques for the production of triploid and tetraploid oysters have improved significantly in recent years. Polyploid oysters typically have higher meat yields and higher growth rates than diploid oysters, primarily because they divert relatively little energy and resources into reproduction. (However, they are not, as sometimes believed, completely sterile.) The greatest potential impact of polyploid oysters, especially triploids, probably lies in geographic regions with extended growing seasons, where normal, diploid oysters continually recycle their gonads. Rather than expend energy on gamete production, triploids direct their energy and other resources into growth. Unfortunately, triploids are very laborious to produce using current laboratory techniques.

Disease and opportunistic infections have also contributed to the decline in annual oyster landings. Although production of triploid and tetraploid oysters could improve disease resistance, significant improvements in this area will more likely be made through selective breeding programs with known disease resistant populations. Populations and selected lines of *C. virginica* have been identified for rapid growth characteristics, resistance to the endoparasite *Haplosporidium nelsoni*, and resistance to juvenile oyster disease. A new approach is the development of strains using transgenic techniques. For either approach, current methods rely heavily on gametes stripped from single-use, sacrificed animals. This approach effectively precludes the development of founder genetic lines.

There are well-developed techniques for the hatchery production of normal diploid seed stock using stripped gametes from sacrificed *C. gigas* and *C. virginica*. These methods provide a relatively predictable and constant source of seed, clutchless spat, and spat for grow-out. Although there is variability in egg production among diploid females, this variability has not been considered to be a major problem because additional animals may always be sacrificed to provide gametes for the hatchery.

Improved hatchery methods for creating triploid and tetraploid oysters have also been developed in recent years. However, these techniques suffer from a high degree of variability. For example, both cytochalasin B-induced triploidy, and survival among resulting larvae has been reported to be highly variable among different *C. virginica* females. In triploid females, variability in the timing of meiosis is sufficiently high that it has been recommended that treatments for producing tetraploids be performed on one female at a time, rather than pooling oocytes from several individuals. While variability in the timing of meiosis unquestionably affects the production of triploids from diploids, and the production of tetraploids from triploid-diploid crosses, one might still expect that such problems could be overcome simply by increasing the numbers of individuals used in breeding. However, such an approach still implies the one-time use of any individual female, thereby removing her particular gametes from future selective breeding efforts, and from the establishment of transgenic founder lines. There are still no satisfactory answers to why there is such high variability among females in the timing of meiosis.

To prepare potential broodstock for stripping, animals are generally conditioned either in natural holding facilities or under controlled temperature, light, and feed conditions in hatchery facilities. Animals are typically selected at random, and may either be biopsied for mature gametes, or simply opened and examined for gonadal condition. Despite efforts to correlate highly fecund and "ripe" individuals with gonadal indices and gross morphological markers such as the presence of genital canals, these features have not proven to be as reliable as was once hoped. Furthermore, visual assessment of gamete quality is difficult and subjective.

An additional problem is that inferior oocytes may be collected by stripping, because there is no control over the condition of the gametes collected, and because the collection will include a mixture of mature and immature gametes. In consequence, a larger number of valuable broodstock must be sacrificed than would otherwise be needed, a particularly acute problem in the case of scarce triploids and tetraploids. As transgenic and disease-resistant lines of oysters are developed, this problem could become even more severe as animals carrying selected or inserted genes are sacrificed to attempt to "perpetuate" genetic lines by stripping the gametes and fertilizing eggs in vitro. Without new technologies for larval production to conserve and protect developed genetic lines, hatcheries will run the risk of sacrificing rare genetic brood stock using current gamete stripping methods, in gambles that sometimes result in little or no larval production.

Why the ova of some females perform exceptionally well in fertilization and subsequent larval development, while others with similar gonadal morphological markers perform very poorly, is not well understood. Oogenesis involves a complex sequence of events that endow the ova with the cell machinery, nutrients (vitellogenins), and appropriate receptors to respond to spawning cues and to interact with sperm. Adding the response receptors and sperm interaction receptors is typically the final step in oogenesis, after which the egg is ready for fertilization. The acquisition of "fertilizability" is a crucial step in oocyte production. Oocytes that are stripped from oysters prematurely may have underdeveloped or missing receptors, and may thus be physiologically unready for fertilization. Synchronization of fertilizability may be improved somewhat by hydrating oocytes for a time prior to insemination.

Oyster growers in the Gulf Coast and elsewhere typically depend heavily on natural spat fall on public grounds as sources for seed to transplant to private leases. Efforts to improve disease resistance, growth, and yield have focused on developing improved genetic strains, for example by polyploid production, selective breeding, or transgenic techniques. In the past, each of these techniques has relied on gametes that have been stripped from sacrificed animals. Thus promising brood stock, oysters with particularly desirable phenotypes, could be used for breeding only once. There is an unfilled need for a method to conserve brood stocks of oysters and other bivalves, to allow breeding without gamete stripping that kills the animals. Such a method would be useful in the production of polyploids, the selective breeding of diploids and polyploids, and in preparing transgenic oyster lines.

The natural spawning of adult oysters and other bivalves can be induced by transiently increasing water temperature, by chemical stimulation with suspensions of sperm, by treatment with hydrogen peroxide, by application of prostaglandins, or by administering biogenic amines such as 5-hydroxytryptamine (serotonin). Drawbacks of these methods include the following: (a) variability in spawning rates, (b) prolonged and highly variable response times, (c) staggered gamete release, producing asynchrony in oocyte age and hydration times, and even (d) parthenogenetic activation of oocytes. Advantages of these methods include the following: (a) gametes that are more likely to have completed the maturation cycle, and (b) survival of the adult animals for future gonadal recycling. There is still an unfilled need for a method that can take advantage of these benefits of naturally-spawned gametes, while decreasing the variability in spawning times and durations.

Hormonal control of reproductive cycles for invertebrates is not as well understood as that for vertebrates. Studies have begun to reveal peptide and steroid hormone patterns in reproductive cycles that show some similarities to those of vertebrates. Both peptide and steroid hormones have been detected in a wide variety of invertebrates, including echinoderms, arthropods, and molluscs.

While estrogen may stimulate both the secretion of yolk proteins (vitellins) and the growth of oocytes (including appropriate oocyte surface receptors), the actual release of mature oocytes in at least some animals appears to be mediated by prostaglandins. It has been proposed that prostaglandins $E_2$ and $F_{2\alpha}$ (also called $PGE_2$ and $PGF_{2\alpha}$, respectively) modulate serotonin-induced sensitivity to spawning. Anti-estrogen compounds (e.g., epitostanol) have been reported to inhibit the increase of $PGE_2$ and $PGF_{2\alpha}$ in the ovary of the Japanese scallop. Serotonin-induced spawning has been reported to be inhibited neither by aspirin nor by indomethacin, if $PGE_2$ is also present in the medium. It has been reported that $PGF_{2\alpha}$ does not ameliorate the effects of the inhibitors, even in the presence of serotonin. Prostaglandins are known to have potent contractile activity, and they have been implicated in follicular rupture and luteolysis in vertebrates.

Prostaglandins are rapidly synthesized in response to physiological stimuli, rather than being stored. Increases in prostaglandins are correlated with ovulation and spawning in many invertebrates. Prostaglandin assays in pre-spawning samples of *C. virginica* have reported both $PGE_2$ and $PGF_{2\alpha}$ in whole body tissues, with considerably higher concentrations of $PGE_2$.

Increased estrogen levels have been reported to stimulate early sexual maturation in female *C. gigas*.

K. Mori, "Effect of Steroid on Oyster—IV. Acceleration of Sexual Maturation in Female *Crassostrea gigas* by Estradiol-17β," *Bull. Jpn. Soc. Sci. Fish.*, vol. 35, pp. 1077–1079 (1969) reported that estradiol-17β could induce sex reversal from male to female in *C. gigas*, and also that injection of a high dose of the analog estradiol-3-benzoate into the gonad promoted an increase in the gonadal-somatic index ratio in *C. gigas*. Some effect on the long-axis length of the egg nucleus may have been seen in treated oysters, but the magnitude of any such effect appeared to be small, and it does not appear to have been statistically significant. No information was reported suggesting that there was any effect on spawning, nor on the stage of meiotic maturation. The reported response time was slow—a response was not reported until about 50 days following injection.

M. Osada et al., "Estrogen effect on the seasonal levels of catecholamines in the scallop *Patinopecten yessoensis*," *Comp. Biochem. Phys.*, vol. 93C, pp. 349–353 (1989) reported that administration of estradiol-17β in vivo to the scallop *Patinopecten yessoensis* decreased levels of catecholamines in the gonad. The authors said that their results suggested that estradiol-17β may play a role in the regulation of catecholamine levels in the gonad.

M. Osada et al., "Pharmacological characterization of serotonin receptor in the oocyte membrane of bivalve molluscs and its formation during oogenesis," *J. Exp. Zool.*, vol. 28, pp. 124–131 (1998) reported in vitro experiments showing that oocytes from the Pacific oyster *Crassostrea gigas* and the scallop *Patinopecten yessoensis* have receptors for serotonin, and that formation of the serotonin receptor on oocyte surfaces was stimulated by estradiol-17β.

Serotonin is known to induce spawning in both the scallop *Patinopectin yessoensis* and the Pacific oyster *Crassostrea gigas*. M. Osada et al., "In vitro effects of estrogen and serotonin on release of eggs from the ovary of the scallop," *Nip. Suisan Gakk. (Jpn. Soc. Sci. Fish. Bull.)*, vol. 58, pp. 223–227 (1992) reported that estradiol-17β had no direct action on the release of eggs in vitro from dissected ovarian pieces taken from the scallop *Patinopectin yessoensis*. However, pre-incubation with estradiol-17β accelerated the release of eggs upon incubation with serotonin in isolated ovarian pieces in vitro. The accelerating effect was inhibited by aspirin, a cyclooxygenase inhibitor, and by actinomycin D, an RNA synthesis inhibitor. It was suggested that prostaglandin, acting as a neuromodulator on serotonin action in the spawning of the scallop, is one of the factors that cause the enhancing effect of estradiol-17β on serotonin action, together with the induction of a protein formation via a genomic action; and that estradiol-17β may enhance sensitivity to external stimuli in egg release with progressing maturity of the scallop. No in vivo experiments were reported, however, and the authors recognized that effects seen in vitro can differ from those in vivo. For example, prostaglandins play a major role in spawning physiology, and Osada et al. acknowledged that prostaglandins are produced as a response to dissection alone. Osada et al. did not suggest any method for maturing oocytes, but were instead concerned with observing the release of already-matured oocytes in vitro.

Q. Li et al., "Changes in vitellin during oogenesis and effect of estradiol-17β on vitellogenesis in the Pacific oyster

*Crassostrea gigas*," *Invert. Reprod. Dev.*, vol. 33, pp. 87–93 (1998) reported that estradiol-17β promoted vitellin (yolk protein) formation in the ovary of the Pacific oyster *C. gigas*, and that the vitellin formation was correlated with an increase in oocyte size.

T. Matsumoto et al., "Gonadal estrogen profile and immunohistochemical localization of steroidogenic enzymes in the oyster and scallop during sexual maturation," *Comp. Biochem. Physiol.*, vol. 118B, pp. 811–817 (1997) reported that gonadal estrogen levels increased seasonally during development of the ovary in the Pacific oyster *Crassostrea gigas* and in the scallop *Patinopecten yessoensis*.

M. Osada et al., "The levels of prostaglandins associated with the reproductive cycle of the scallop, *Patinopecten yessoensis*," *Prostaglandins*, vol. 40, pp. 229–239 (1990) reported that the levels of prostaglandins $PGE_2$ and $PGF_{2\alpha}$ increased during sexual maturation, and that the levels in the ovary showed a marked increase during the spawning season. Administration of antiestrogen inhibited the increase of $PGE_2$ and $PGF_{2\alpha}$ during sexual maturation. It was suggested that $PGE_2$ and $PGF_{2\alpha}$ were closely related to the reproductive cycle and may be involved in the sexual maturation and spawning of the scallop.

T. Matsutani et al., "Induction of spawning by serotonin in the scallop, *Patinopecten yessoensis* (Jay)," *Mar. Biol. Lett.*, vol. 3, pp. 353–358 (1982) disclosed that an intragonadal injection of serotonin in the scallop *Patinopecten yessoensis* stimulated spawning in both sexes.

T. Matsutani et al., "In vitro effects of serotonin and prostaglandins on release of eggs from the ovary of the scallop, *Patinopecten yessoensis*," *Gen. Comp. Endocrin.*, vol. 67, pp. 111–118 (1987) disclosed that when pieces of ovary from the scallop *Patinopecten yessoensis* were incubated with serotonin in vitro, the number of released eggs increased significantly. Methysergide, a serotonin antagonist, inhibited the release of eggs. Adding aspirin or indomethacin did not inhibit serotonin-induced egg release if $PGE_2$ was also present. $PGE_2$ did not induce egg release, but enhanced the effect of serotonin. By contrast, $PGF_{2\alpha}$ significantly inhibited the effect of serotonin. See also T. Matsutani, "Endogenous factors controlling spawning in marine bivalves," pp. 231–237 in M. Hoshi et al. (Eds.) *Advances in Invertebrate Reproduction*, vol. 5 (1990).

P. Fong, "Zebra Mussel Spawning Is Induced in Low Concentrations of Putative Serotonin Reuptake Inhibitors," *Biol. Bull.*, vol. 194, pp. 143–149 (1998) reported that serotonin and its receptor ligands induce both oocyte meiotic maturation and spawning in zebra mussels (*Dreissena polymorpha*); and that selective serotonin reuptake inhibitors such as fluvoxamine, fluoxetine, and paroxetine can induce spawning in both sexes of zebra mussels.

There remains an unfilled need for improved methods to induce spawning in bivalves, particular methods that promote the synchronous release of mature oocytes while leaving the animals alive and available to produce gametes in future breeding seasons. There is also an unfilled need for methods to enhance the very low fecundity of polyploid oysters.

I have discovered a method for using a spawning agent and a steroid to stimulate gonadal development, oocyte maturation, and meiotic synchrony in oysters and other bivalves. Advantages of the novel technique include a decrease in the variability of fertilization among different individuals, a decrease in the variability of larval production by synchronizing gamete maturation within a population, the ability to mature and spawn broodstock without sacrificing the animals, the ability to conserve and maintain genetic lines, and the ability to improve cross-breeding programs, with or without the use of transgenics, by repeated spawning of individuals.

The present invention may be used, for example, in oyster hatchery production, with an emphasis on conservation of broodstock. The invention allows the successful and repeatable breeding of either diploids or polyploids, selective breeding, and the breeding of transgenic oyster lines, all without the need to sacrifice the founder animals. It is possible that individual founder animals could live ten or more years, while still contributing gametes to breeding programs.

In summary, the animals are first treated with estradiol-17β (or another estrogen) or an estrogen agonist, which is preferably administered by injection, but which may also be administered by addition to food or water. The estradiol-17β or agonist promotes the maturation of oocytes, so that mature oocytes are then released with high synchrony in response to subsequent treatment with serotonin, or in response to other spawning stimuli such as heat shock or sperm extracts. The serotonin is preferably administered by addition to the water, but it may also be administered by injection. The serotonin may optionally be supplemented by the addition of one or more prostaglandins.

The administration of pharmacological doses of estradiol-17β to mature or maturing *C. virginica* and other bivalve females enhances gamete maturation, enhances matured gamete release, and increases the synchrony of meiotic stages in post-ovulated ova. Advantages include reduced variability in gamete maturation, enhanced ability to breed triploids and tetraploids, and the ability to bring tetraploids, triploids, selected brood stock, and transgenics to a maturation state and to induce spawning, while conserving valuable broodstock for breeding in future seasons. This technique greatly enhances the ability to establish founder genetic lines. The benefits for the oyster industry and other bivalve industries include: a decrease in the variability of individual fertilization and larval production by synchronizing gamete maturation; the ability to mature and spawn valuable brood stock (transgenic or otherwise), without the need to sacrifice animals, thereby conserving promising genetic lines; and an enhanced ability to conduct cross-breeding programs, with or without transgenics, by repeated spawning of individuals. The technique also allows multiple spawnings in a single season, which has not previously been possible to achieve in a reliable manner for bivalves generally.

The compounds used in practicing this invention, e.g. estradiol-17β and serotonin, are relatively benign, meaning that practicing this invention should have minimal impact on the environment. Serotonin is a naturally occurring amino acid, is produced by many organisms, and breaks down rapidly in an aqueous environment. Estradiol-17β is a naturally occurring steroid hormone in both molluscs and many other animals. Although estradiol-17β will not degrade in the environment as rapidly as serotonin, its potential impact on the environment should nevertheless be minimal for the following reasons: (a) The broodstock to which the compounds are administered will not normally be intended for consumption. (b) The total number of animals treated at any one time should be small in practice. (Fewer than 500 broodstock need to be treated simultaneously during a season to retrieve mature oocytes sufficient in number to set spat and ship to commercial oyster farmers.) (c) The accidental release of all estradiol-17β used for a treatment group of 500 animals (at maximal proposed dosages) into a typical one thousand gallon tank (about 4000 l) would result in a concentration less than 500 ng/L (0.5 ppb). Furthermore, in a contained environment the steroid may be removed from the water by filtering, such as over activated charcoal. Even if the entire amount were released into a small estuary, further dilution would reduce actual concentrations in the environment to significantly lower figures. For comparison, a typical ethinyl estradiol dose in a single low-dose (human) birth control pill is 20 µg, or five times the amount injected into a single oyster at the highest dose used in these experiments.

EXAMPLE 1

A series of initial experiments assayed the response of *C. virginica* to low doses of estradiol-17β. These trials were undertaken in August and September, at the end of the normal maturation and spawning season of this species on the Gulf coast. Experiments typically ran for two weeks following the injection of a single dose of estradiol-17β into the abductor muscle. (Injections were made through a small hole drilled in the shell.) The estradiol dosage for each animal was calculated based on wet body mass of the whole animal, as estimated from its shell length. (These estimates were based on linear regression from measurements of shell lengths and wet body mass from 62 mixed-sex oysters that had been harvested in July). Dosages in the initial experiments were either 5 or 20 times the normal physiological levels for wild animals. (The normal physiological level is 1.5 ng per gram wet weight. So a 5× dosage is 7.5 ng per gram wet weight, and a 20× dosage is 30 ng per gram wet weight.) Responses to the estradiol treatment were based on visual assessment of gonadal condition, on the response of the excised whole animal to a solution of 0.01 mM 5-hydroxytryptamine during a 45 min treatment period, and on histological examination of samples of the oyster taken through the body mass containing the gonadal region.

Over three trials, low levels of estradiol-17β (5×) caused significantly greater spawning than was observed in controls (Chi-square analysis, p<0.001). Visual observation confirmed qualitatively that gonadal tissues were enhanced in treated animals. Animals that received high doses of estradiol-17β (20×) had much greater gonad development than did the controls. The animals receiving the lower 5× doses were notably less developed, but still considerably more developed than controls. Controls frequently had either no gonadal mass present, or the tissue appeared to be either spawned out or degenerative.

Although many individuals did not spawn during these initial trials, it was still highly noteworthy that the oysters responded to these treatments at all, during a time of year when their reproductive capacity is usually in sharp decline. See Table 1. Histology samples from the animals revealed several differences between the estradiol-treated animals and controls. After treatment with serotonin, the gonadal acini of the estradiol-treated animals contained substantial numbers of free oocytes in the open spaces. The estradiol-treated animals also displayed the greatest numbers of released oocytes, as determined by subjective comparison of the density of oocytes observed. Germinal vesicles were present in all oocytes, which also had distinct nucleoli. However, not all treated animals developed in response to the estradiol, and some even exhibited degenerating ovarian masses, similar to those observed in the controls. The control animals contained acini with numerous necrotic oocytes—even those control animals that had responded to serotonin treatment by releasing oocytes. In other controls, the ovarian mass was clearly degenerating and had few oocytes, and most of the germinal vesicles lacked a nucleolus and were vesiculated. Males in the treated group had intact testicular material with mature or maturing spermatids and spermatozoa. Males in the control group showed only weakly developed or immature spermatozoa. These data established that the animals are capable of responding to the hormonal therapy, and that many of them will subsequently spawn in response to a serotonin stimulus.

TABLE I

Respons of Oysters to Estradiol-17β and Serotonin after Normal Spawning Season (Grand Isle, LA)

| Date of Experiment | Injection Concentration (ng per gram wet weight) | Animals responding to 5-hydroxytryptophan stimulus - no. (%) | Animals not responding to 5-hydroxytryptophan stimulus - no. (%) |
|---|---|---|---|
| Aug. 18, controls | 0 | 2 (25%) | 6 (75%) |
| Aug. 18, estradiol-17β | 75 | 8 (58%) | 6 (42%) |
| Sep. 15, controls | 0 | 6 (35%) | 11 (65%) |
| Sep. 15, estradiol-17β | 7.5 | 8 (40%) | 12 (60%) |
| Sep. 22, controls | 0 | 2 (7%) | 28 (93%) |
| Sep. 22, estradiol-17β | 15 | 11 (35%) | 21 (65%) |

The three trials summarized in Table 1 were analyzed using a yes/no non-parametric chi-squared analysis. Overall, the number of control females that released oocytes was significantly less (P<0.001) than the number of estradiol-injected females that released oocytes.

EXAMPLE 2

In another experiment, conducted in May in Grand Isle, La., animals were injected either with 0 (control), 37.5 ng/g, or 74 ng/g of estradiol-17β. After 14 days, animals were evaluated using the traditional methodology of assaying the presence of prominent genital canals, indicative of mature animals that are ready to spawn. These animals were not subjected to serotonin treatment, but rather were sacrificed for histological examination to establish a somatic-gonadal ratio index. Table 2 depicts the numbers (and percentages) of animals that displayed prominent genital canals. Analysis of the data in Table 2 using a contingency-table Chi-squared analysis showed that the differences between experimental and control animals showing prominent genital canals was significantly different (P<0.005) and was dose dependent (P<0.001). Data analysis was performed using GraphPad InStat software. The data reported in Table 2 are conservative, in the following sense: During the trial period, the water temperature decreased from 23° C. to 18° C., and then increased to 22° C., all within a thirty-six hour period. Such a temperature change is alone often sufficient to trigger spawning in the wild.

TABLE 2

|  | controls (0 ng estradiol-17β) | dose 1 group (37.5 ng/g estradiol-17β) | dose 2 group (74 ng/g estradiol-17β) |
|---|---|---|---|
| number (percent) with prominent genital canals | 3 (6%) | 11 (22%) | 18 (34%) |

TABLE 2-continued

|  | controls (0 ng estradiol-17β) | dose 1 group (37.5 ng/g estradiol-17β) | dose 2 group (74 ng/g estradiol-17β) |
|---|---|---|---|
| number (percent) without prominent genital canals | 48 (94%) | 38 (78%) | 35 (66%) |

EXAMPLE 3

In trials with 261 triploid *C. virginica* oysters that began on May 31 in Grand Isle, La., the oysters were notched and were then injected with 150 ng/gm wet weight estradiol 17β. Ten days later, the animals were sacrificed, and their sex and gonadal condition were determined. Of the 261 animals tested, 13 were confirmed female triploids. These 13 triploid females yielded a total of 6 million oocytes by traditional stripping techniques, which is not a high yield in comparison to diploid animals, but was high compared to untreated triploids.

For comparison, on May 6 of the following year, 165 animals selected from the same original cohort of triploid oysters were sacrificed without the estradiol treatment. No triploid females were seen in this group, and no oocytes were collected from any of them. While these observations were made one year apart, both sets of observations involved triploid animals sharing the same diploid parents. The estradiol-treated group was 2 years old at the time of observation, while the untreated group one year later was 3 years old. Thus these results are not fully comparable. However, in support of the effectiveness of the treatment, it may be noted that the three-year-old, untreated animals were sacrificed at a time when the population of mature and spawning diploid animals in the same location was at its peak, whereas the two-year-old, estradiol-treated animals were examined when the number of mature and spawning diploids was in decline.

These observations confirmed that triploid females do respond to the novel treatment. These observations also suggest the possibility that the treatment may affect a subpopulation of oysters that has traditionally been characterized as having indifferent gonads. Further observations will confirm the hypothesis that these estradiol treatments can influence the sex of the oysters at either the juvenile stage, or in the adult stage when the gonad is in an indifferent state; i.e., where the sex cannot readily be determined.

EXAMPLE 4

Optimum dosages, timing, and treatment period for both estradiol-17β and serotonin are being established through routine experimentation, by observing effects on gonadal maturation, oocyte maturation (fertilizability), and meiotic synchrony in diploid *C. virginica*. Later, optimal doses will also be determined in diploid *C. gigas, Patinopecten yessoensis*, and other bivalves; as well as in polyploid individuals of each of these species.

EXAMPLE 5

*Crassostrea virginica* approximately two years old are collected from local Gulf Coast oyster reefs, or purchased from oyster suppliers, between January and March. At a coastal hatchery facility, animals are suspended in oyster bags from piers. For experimental protocols, animals are held for conditioning in groups on seawater tables in the hatchery immediately prior to and during the experiments. Some animals may also be transported to an inland laboratory, and temporarily held in artificial systems for short-term experiments and analysis. Animals are allocated to experimental groups on a random basis.

The effect of estradiol-17β dosage on gonadal maturation in female oysters is examined in vivo in greater detail. Animals are randomly selected, and a small hole (5/32 in, 0.4 cm) is drilled into the shell approximately 2/3 of the length of the shell distal from the hinge. (Such holes typically heal in about 4–5 days. Drilled animals in earlier experiments had a mortality rate of about 10–12% compared to undrilled, untreated animals, probably due primarily to mechanical damage. Preliminary data from more recent experiments suggest that mortality has lessened to near zero as the result of a new drilling procedure—namely, a slot is ground into the edge of the valves, minimizing tissue damage.) Some of the animals will be biopsied with a capillary tube to determine sex and to determine the condition of ripeness without removing the shell. Because estradiol has previously been assayed in male gonadal tissues, and because prostaglandin synthesis has been correlated with spawning, at least initially no distinction is made between male and female animals in these estradiol treatments. Hemolymph samples (0.2 to 0.5 mL) may be taken at this time to determine baseline levels of estrogen and prostaglandins. Animals are marked, and their conditions are recorded.

EXAMPLE 6

Whole animal assays are conducted on oysters taken from natural environments, at various stages of maturation. Animals are held under controlled conditions of temperature and feed during the experiments. Treatment groups comprise: (a) injection into the abductor muscle with 0.05% DMSO (control), and (b) treatment with a bolus injection into the abductor muscle of estradiol-17β in a DMSO carrier, diluted to the appropriate concentration in seawater. Actual dosages for the in vivo injections are estimated based on the relative sizes of the oyster (see discussion above). Physiological levels of estradiol in *C. gigas*, assayed directly in the ovary, have been reported to be 1.5 ng/g total wet body mass (Matsumoto et al., 1997). Until a similar assay has been completed in controls, it will be assumed that the normal physiological level of estradiol-17β in *C. virginica* is approximately the same. The dose administered by injection to achieve intracellular concentrations in the physiological range is determined by routine experiment, and is expected to be in the range of 5–10 times greater than the physiological amount; but it is possible that the dose administered could be even higher to achieve the desired pharmacological effect. Initial trials will deliver estradiol-17β to the animals in the range 0 to 150 ng/g estimated total wet body mass (i.e., 0 to 100 times the normal estimated physiological levels). Observed results are used to establish a dose-response curve.

EXAMPLE 7

The response of estradiol-treated animals and of untreated controls to an injection of 5-hydroxytryptamine (serotonin) is determined; and their respective success rates in producing larvae to the trochophore stage are evaluated. A minimum of 3 trials of 40 replicates is conducted (160 total animals in each trial, including controls). The animals range in size from 75 to 120 mm in shell length. Dosage levels will be 0 ng/gm total wet body mass (control), 75 ng/gm wet body mass, and 150 ng/gm wet body mass. Trials begin in April–May, and separate trials are staggered by 5–7 days. Animals are initially injected with appropriate dosages on day 0, and are then injected a second time on day 8. Assays are performed on day 14. Each trial is split into two groups. Half of the animals in each group are injected with serotonin on day 14 to induce spawning. The remaining half of the animals are opened, excised from the shell, weighed, visually examined for gonadal development, and placed in a solution of $10^{-5}$ M serotonin to induce spawning. In both groups, eggs are collected from spawning animals 45 minutes after the serotonin treatment and are then inseminated. For fertilization sequences each day, wild animals are opened, and those identified as males are held in a cool chamber with both valves in place until used. Inseminations are adjusted to yield a final concentration of approximately 5,000 sperm/mL of egg suspension.

Based on preliminary results previously observed following estradiol-17β treatments, it is expected that during the prime of the reproductive season experimental animals should respond to the treatment with significantly enhanced spawning and meiotic synchrony as compared to control animals. Even where spawning is not substantially enhanced or synchronous, it is still expected that gametes stripped from treated animals (as a last resort only) should be more uniformly mature across individual animals. Even where stripping is used, the increased uniformity of gamete maturity should be beneficial to standardizing protocols for triploid and tetraploid production.

Estrogen levels are monitored in each animal by collecting a small hemolymph sample with an insulin-type syringe. Hemolymph samples are cleared of particulates by centrifugation, and are then assayed with EIA (enzyme immunoassay) kits specific for estradiol-17β (available from commercial vendors, e.g. Cayman Chemicals, Ann Arbor, Mich.).

Tissue samples of a transect in sacrificed animals through the gonads at the gill-palp junction are immediately frozen and held in liquid nitrogen or at −70° C. for later assay. After thawing, assays are conducted on these tissue samples to determine the presence and concentrations of estradiol-17β, prostaglandin $E_2$, and prostaglandin $F_{2\alpha}$ using EIA kits available from commercial vendors (e.g. Cayman Chemicals). The results of these assays are compared and correlated to observations on the uniformity of gamete quality, the response to spawning stimuli, and developmental ability, to confirm efficiency of the treatment for synchronizing and enhancing gamete maturation. A second set of transects is fixed in seawater-buffered, 10% formalin for histochemical preparations.

EXAMPLE 8

While initial data have demonstrated an increase in maturation and gonadal development in a dose-dependent manner resulting from single doses, it may be the case that an optimal treatment regime would entail multiple dosages, as will be determined in future experiments. For example, in this alternative embodiment, multiple injections of estradiol-17β are given at 3–5 day intervals over a treatment period. Optionally, each successive injection increases the dosage level until a maximal dosage is reached. For example, trials will be conducted on groups of animals (40 experimental, 40 controls), with a dosage of 15 ng estradiol-17β per gram wet weight on day 0, 30 ng per gram wet weight on day 5, 45 ng per gram wet weight on day 10, and 60 ng per gram wet weight on day 14, followed by administration of serotonin to induce spawning on day 15. Such a regime may approximate more closely the natural conditions of gradual estradiol-17β increase.

Increasing the dosage over a period of time may also be accomplished by a metered release technique, for example, implanting a silastic tubing containing fixed dosages of estradiol-17β.

EXAMPLE 9

Experiments otherwise similar to those described above will be conducted to demonstrate that the gonads of oysters (and other bivalves) that are treated in accordance with the present invention can recover and re-cycle for further spawning on both a short-term (e.g., 2–3 weeks) and a long term (year-to-year) basis.

EXAMPLE 10

The treatment is compared for early versus late spawning seasons. There is a minimum replicate of 20 females in each early experimental group, each early control group, each late experimental group, and each late control group, for a minimum of 80 animals for each trial replicate. There are a minimum of three separate test groups, i.e., a minimum total of 240 animals across all test groups. These experiments are conducted during the early spawning season (April/May), and during the later spawning season (July/August).

Several measurements are taken. The number of oocytes released is measured after a pulse treatment of $10^{-6}$ M 5-HT, either in the water column or injected into the intragonadal tissue. The stage of meiotic maturation of the released oocytes is determined. In at least one round of experiments some animals are sacrificed, and gonadal transects are removed for histological examination, and for testing $PGE_2$ and $PGF_{2\alpha}$ levels. Those animals not sacrificed in the first year in vivo trials are returned to a natural environment and held for a second year of experiments. In the second year, first year animals are reallocated randomly to treatment groups in May/June, and treatments will be performed again to test for repeatability.

EXAMPLE 11

In additional experiments during the second year, new animals receive the same treatments as described above for the first year, and are then returned to natural holding conditions. After approximately 2–3 weeks, the animals are passed through the same treatment series a second time to confirm that the novel treatment permits multiple stimulations of ovarian maturation within a single season.

EXAMPLE 12

During both years of experiments, any animals that are unresponsive to serotonin-induced spawning will be cycled back into the treatments and a second spawning attempted during the same season. Without wishing to be bound by this theory, it is expected that, after a brief recuperation period, a majority of animals in each of the following categories should respond to the estrogen/serotonin treatments: once-spawned animals, animals recycled from the first year, and animals that initially fail to respond to treatment. Straightforward experiments will determine appropriate inter-spawning rest periods for adequate physiological recycling.

EXAMPLE 13

Each of the protocols described above, which is initially used in diploid animals, is also confirmed for efficacy in triploid and tetraploid animals.

EXAMPLE 14

During subsequent years additional experiments are performed to correlate levels of prostaglandins $E_2$ and $F_{2\alpha}$ with dosages of estrogen; i.e. to determine whether the administration of estrogen causes levels of $PGE_2$ and $PGF_{2\alpha}$ to vary from levels in controls. Conversely, experiments are also conducted to determine the effects of prostaglandins on spawning in control oysters and estradiol-treated oysters.

The effect of $PGE_2$, $PGF_{2\alpha}$, or both is addressed by an additional series of experiments on estrogen-treated and control oysters. This series of experiments determines hormone levels in pre-spawning animals. A group of 40 control animals and 40 animals treated with optimal doses of estradiol-17β are sacrificed without induction of spawning. (Optimal doses of estradiol-17β are as determined from earlier experiments.) Oysters are opened and the hearts exposed. A 0.2–0.5 mL sample of hemolymph is collected directly from the heart, and is frozen in liquid nitrogen for transport to the laboratory. Tissue samples are excised by double transects (approximately 10 mm thick) through the visceral mass at the level of the gill-palp junction. One transect is immediately frozen in liquid nitrogen for transport to the laboratory. The second transect is fixed in a 10% seawater-buffered formalin solution for 48 hours, rinsed in seawater, and then held for histological preparation.

Two procedures are used to handle these tissue samples. Hemolymph samples are thawed and cleared of debris by high speed centrifugation. The cleared supernatant is directly assayed for prostaglandins, following the procedures of D. Saintsing et al., "Production of prostaglandins $E_2$ and $F_2$, in the freshwater mussel Ligumia subrostrata: relation to sodium transport," J. Pharm. Exp. Therap., vol. 266, pp. 455–461 (1983). Standard curves are established for each batch of assays by adding a known concentration of the appropriate authentic prostaglandin to phosphate-buffered saline for the EIA.

As an alternative procedure, $PGE_2$ is extracted from whole tissue samples using an affinity resin procedure (e.g. Cayman chemicals #414020). Prostaglandin $F_{2\alpha}$ is extracted from the remaining supernatant using the procedure of Saintsing et al. (1983) using Sep Pak Vac $C_{18}$ cartridges (Waters, Milford, Mass.) (or equivalent). Following a water rinse of the column, the column is eluted with methanol. Methanol extracts are dried in a nitrogen gas stream, and the resulting powder is suspended in appropriate buffered media (i.e., buffered media compatible with the particular EIA kit being used). Assay kits from various vendors, such as Cayman Chemicals, are available that have high specificity for these two prostaglandins, with minimal cross-reactivity between $PGE_2$ and $PGF_{2\alpha}$.

Without wishing to be bound by this theory, it is expected that there will either be a decrease or little change in the levels of $PGF_{2\alpha}$, whereas significant increases in $PGE_2$ should be seen following treatment.

EXAMPLE 15

Another series of experiments is conducted on a group of 60 control animals, and on a group of 60 animals receiving the optimal estradiol-17β treatment. Each of these groups is divided into three sub-groups of 20 animals each: one subgroup receives no additional treatment (control), one is injected with what has been determined as the physiological level of prostaglandin $E_2$, and one is injected with what has been determined as the physiological level of prostaglandin $F_{2\alpha}$. Within one hour after injection with prostaglandin or PBS, all oysters in all subgroups are injected with $10^{-5}$ M serotonin to induce spawning. Oocytes are collected, and the total number of oocytes released is estimated from an aliquot collected above each individual. Without wishing to be bound by this theory, it is expected that significantly greater numbers of oocytes will be released by $PGE_2$-pretreated controls as compared to all other controls, and significantly greater numbers of oocytes yet will be released by the estradiol-17β/$PGE_2$-treated animals as compared to all other subgroups.

The results are evaluated by multidimensional analysis. Histological specimens are scored on a subjective basis for oocyte condition, size, and quantity, and are also used to establish the somatic-gonadal index. Oocyte release following serotonin stimulation, and the fertilizability of the released oocytes are both directly assayed. Both types of data are analyzed statistically using parametric or non-parametric statistics, as appropriate for a particular experimental design. Statistical differences in the results of all experiments are evaluated by ANOVA or Chi squared analysis, using the InStat[7]® statistical package software (Graph-Pad Software, San Diego, Calif.).

EXAMPLE 16

Although this technique was originally developed for use in the east coast oyster C. virginica, it will also work in the Pacific oyster C. gigas and in other bivalves, such as the scallop Patinopecten yessoensis, in clams, and pearl oysters. Examples of other saltwater bivalves in which this technique may be used include Crassostrea ariakensis, Saccostrea commercialis, Ostrea angast, Mytilus edulis, Spisula solidissima, Trostrea lutaria, Ostrea chilensis, Pinctada maxima, Ostrea edulis, Ostrea lamellosa, Mercenaria mercenaria, Mya arenaria, Argopecten irradans, Tapes philippinarium, Cassadoma gigantea, Tridacnae maxima, Tridacnae squamosa, and Tridacnae gigas. Examples of freshwater bivalves in which this technique may be used include Anodonta grandis, Dreissena polymorpha, Corbicula fluminea, Quadrulla nodulata, Quadrulla quadrulla, Quadrulla pustulosa, Quadrulla metanerva, Margretifera margretifera, Ligumia recta, Actinonaias ligamentina, Amblema plicata, Ellipsaria lineolata, Fusconaia ebena, Fusconaia undata, Lampsilis orbicualta, Lampsilis ovata, Lampsilis teres, Obovaria olivaria, Pleurobema cocineum, Pleurobema cordatum, Tritogonia vernucosa, Toxolasma texasensis, Megalonaias nervosa.

Miscellaneous

As used in the specification and claims, an "effective amount" of estradiol-17β, or an "effective amount" of serotonin (or agonists or inhibitors), or an "effective amount" of a spawning stimulus such as treatment with heat shock or sperm extract, is an amount that, when administered to a bivalve in succession after the lapse of a suitable intervening time, causes the release of a substantial number of oocytes. Preferably, the amounts are such that the released oocytes are substantially in meiotic synchrony. Unless context clearly indicates otherwise, as used in the specification and claims "synchrony" or "meiotic synchrony" means that at least about 50% of the oocytes released are in substantial meiotic synchrony (i.e., in the same phase: meiosis prophase 1, diplotene, meiosis metaphase 1, etc.) for a given female. In preferred embodiments, at least about 80% of those females within a group of bivalves that do spawn should release oocytes in substantial meiotic synchrony for a given female. In other words, even in preferred embodiments, it may be the case that not all females spawn, but of those females that do spawn, at least about 80% of the females, each considered individually, will release oocytes that are in substantial meiotic synchrony. Oocytes from different females may or may not be in synchrony with one another, however.

The term "mature" as applied to bivalves and bivalve oocytes sometimes has different meanings in different contexts, or has different meanings as used by different authors. As used in the claims below, the term "mature" (and related word forms, e.g., matured, maturing, etc.) should be understood to mean the completion of vitellogenesis, growth, and organization of the cellular machinery to the point at which normal fertilization, and subsequent embryonic development and growth can ensue. At this point, the oocytes are still in the meiotic prophase I condition, and are ready to be spawned and thereafter to complete meiotic maturation.

The novel technique may be practiced not only with estradiol-17β and serotonin, but also with their respective agonists. Such agonists are well known in the art. Agonists of estradiol-17, include, for example, ethinyl estradiol, mestranol, estradiol cyprionate, diethylstilbestrol, and estrone. Agonists of serotonin include, for example, BW723c86, bmy7378 2HCl, BRL 54443 maleate, bufotenine monooxalate, busiprone HCl, carboxamidotryptamine maleate, 1-(m-chlorophenyl) biguanide HCl, 1-(3-chlorophenyl)-piperazine HCl, CGS-12066b maleate, N,N-dipropyl-5-carboxamidotryptamine maleate, DOI HCl, DOI HCL R, DOI HCl S, DOB HBr, DMA HCl, 5HTQ iodide, 8-hydroxy-DPAT HBr, 8-hydroxy-DPAT HBr R, 8-hydroxy-DPAT HBr S, (L-694,247), D-lysergic acid diethylamide tartrate, Lisuride hydrogen maleate, 5-methoxy DMT oxalate, 1-(2-methoxyphenyl)-piperazine HCl, 5 methoxytryptamine HCl, 2-methylserotonin maleate, alpha-methylserotonin maleate, 5-(nonyloxy)-tryptamine hydrogen oxalate, oxymetazoline HCl, PAPP(Ly-165,163), 1-phenyl-biguanide, quipazine dimaleate, quipazine, -methyl dimaleate, SC53116, serotonin creatinine sulfate, serotonin HCl, serotonin oxalate, spiroxatrine, TFMPP HCl, UH-301 HCL, urapidil HCl, Urapidil5-methyl, and WB-4101 HCl. Such agonists are available from commercial sources, such as Sigma (St. Louis, Mo.).

In addition, serotonin uptake inhibitors are expected to have significant activity to induce spawning. Serotonin uptake inhibitors mimic serotonin by preventing the cycling of serotonin, causing the effective concentration of serotonin to build up in the tissues rather than being taken back up. Such inhibitors are well known in the art, and include, for example, Alaproclate HCL, Clomipramine HCl, Fenfluramine HCL S, fluoxetine, imipramine HCl, indatraline, quipazine 6-nitro, trazodone HCl, and zimelidine HCl, fluvoxamine, and paroxetine.

Unless context clearly indicates otherwise, as used in the claims the term "significant" or "significantly" refers to statistical significance at the $P<0.05$ level, or such other measure of statistical significance as would be applied by a person of ordinary skill in the art to a particular observation.

The complete disclosures of all references cited in this specification, including the entire disclosure of the priority application 60/392,127 are hereby incorporated by reference. Also incorporated by reference are the entire disclosures of each of the following grant proposals, none of which is believed to have been published as of the priority date of this application, and none of which is believed to be prior art to this application: J. Lynn et al., Excerpts from "Conservation of rare brood stock: Developing improved methodology for gonadal maturation and inducing spawns in *Crassostrea virginica*," Gulf Oyster Industry Program grant proposal (2001); J. Lynn et al., Excerpts from "Conservation of rare broodstock: Developing improved methodology for maturation and induced spawning of oysters," Louisiana Board of Regents grant proposal (2001); and J. Lynn et al., Excerpts from "Conservation of broodstock: Developing improved methodology for maturation and induced spawning of oysters," United States Department of Agriculture grant proposal (2002).

I claim:

1. A method for maturing and releasing oocytes in a bivalve, said method comprising the sequential steps of:
   (a) administering to a living, intact bivalve an effective amount of a maturation stimulus comprising exogenous estrogen or an exogenous estrogen agonist;
   (b) allowing oocytes in the bivalve to mature in response to the maturation stimulus; wherein substantially more oocytes mature than would mature on average in the same time in an otherwise identically-situated bivalve that had not been administered the maturation stimulus; and
   (c) administering to the bivalve an effective amount of a spawning stimulus; whereby the bivalve releases mature oocytes; wherein substantially more mature oocytes are released than would be released on average by an otherwise identically-situated bivalve that had not been administered the spawning stimulus; wherein the spawning stimulus is selected from the group consisting of exogenous serotonin, an exogenous serotonin agonist, an exogenous serotonin uptake inhibitor, heat shock, sperm extract, or other spawning stimulus.

2. A method as recited in claim 1, wherein the bivalve is not killed before the release of oocytes.

3. A method as recited in claim 2, wherein the bivalve is allowed to rest for a time after the release of oocytes; and wherein the same method is subsequently applied again to the same bivalve, to cause a subsequent release of oocytes from the same bivalve during the same breeding season.

4. A method as recited in claim 3, wherein the subsequent release of oocytes occurs significantly earlier than a subsequent release of oocytes would occur, on average, in an otherwise identically situated bivalve that is not treated in accordance with the recited method.

5. A method as recited in claim 2, wherein the bivalve is allowed to rest for a time after the release of oocytes; and wherein the same method is subsequently applied again to the same bivalve, to cause a subsequent release of oocytes from the same bivalve during different breeding seasons.

6. A method as recited in claim 1, wherein the matured oocytes are released substantially in synchrony.

7. A method as recited in claim 1, wherein the bivalve is a triploid.

8. A method as recited in claim 1, wherein the bivalve is a tetraploid.

9. A method as recited in claim 1, wherein the bivalve is a female.

10. A method as recited in claim 1, wherein the bivalve has an indifferent gonad; wherein said method additionally induces the bivalve to develop as a female.

11. A method as recited in claim 1, wherein the bivalve is a hermaphrodite.

12. A method as recited in claim 1, wherein the bivalve is *Crassostrea virginica*.

13. A method as recited in claim 1, wherein the bivalve is *Crassostrea gigas*.

14. A method as recited in claim 1, wherein the bivalve is *Patinopecten yessoensis*.

15. A method as recited in claim 1, wherein said method causes the bivalve to release oocytes outside of the normal breeding season.

16. A method as recited in claim 1, wherein the maturation stimulus comprises estradiol-17β; and wherein the spawning stimulus comprises serotonin.

17. A method as recited in claim 1, wherein the spawning stimulus comprises fluvoxamine.

18. A method as recited in claim 1, wherein the spawning stimulus comprises treatment with heat shock or sperm extract.

19. A method as recited in claim 1, wherein the maturation stimulus is administered to the bivalve in a single dose.

20. A method as recited in claim 1, wherein the maturation stimulus is administered to the bivalve in sequential doses over a period of time, wherein the sequential doses may be constant or may increase over time.

21. A method as recited in claim 1, wherein the spawning stimulus comprises a serotonin agonist.

22. A method as recited in claim 1, wherein the spawning stimulus comprises a serotonin uptake inhibitor.

23. A method as recited in claim 1, wherein the maturation stimulus comprises an estradiol-17β agonist.

* * * * *